Figure 1:
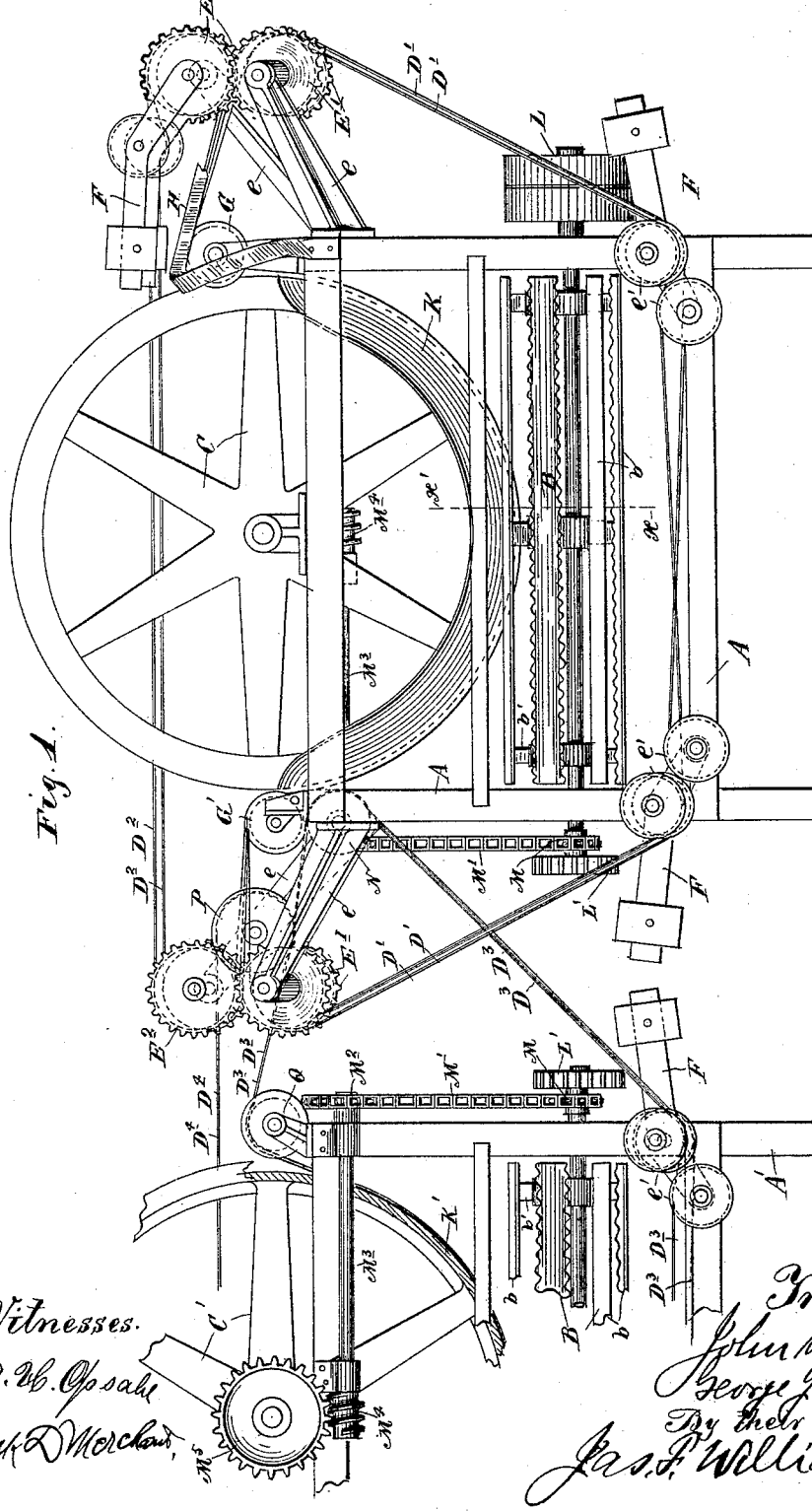

(No Model.) 6 Sheets—Sheet 1.

J. McGRATH & G. Y. SMITH.
FLAX SCUTCHER.

No. 460,303. Patented Sept. 29, 1891.

Witnesses.
A. H. Opsahl
Frank D. Merchant

Inventors
John McGrath
George Y. Smith
By their Attorney.
Jas. F. Williamson

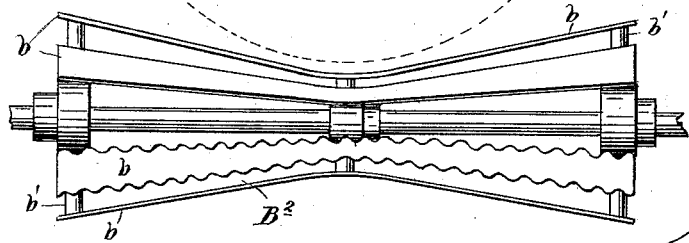
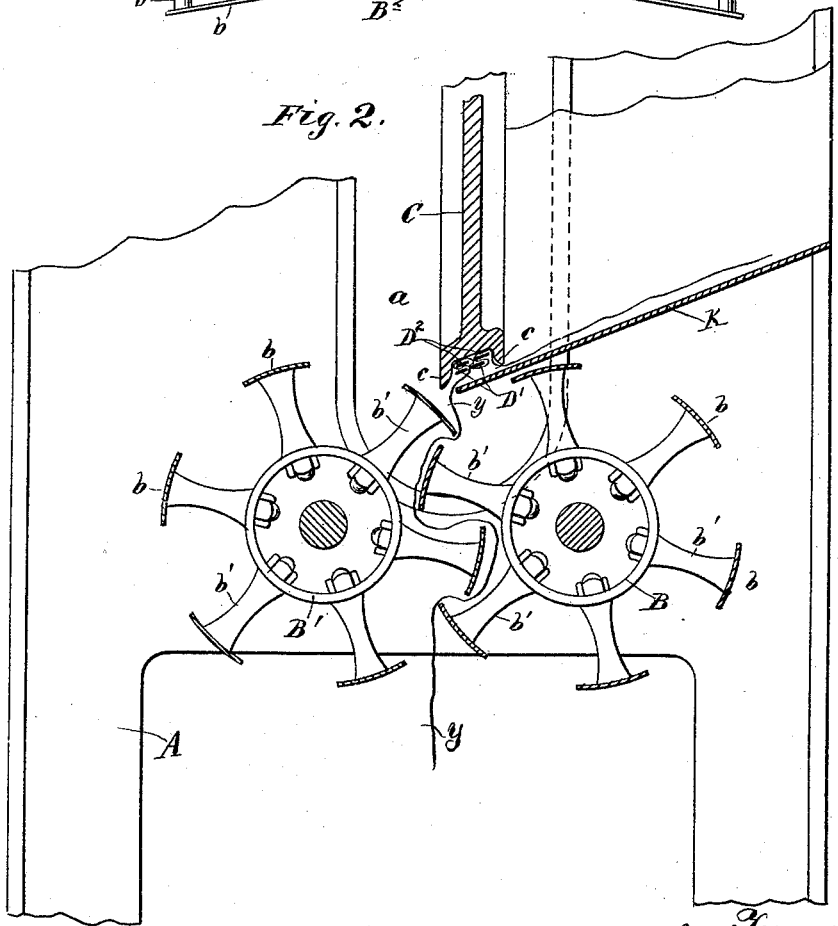

(No Model.) 6 Sheets—Sheet 3.

J. McGRATH & G. Y. SMITH.
FLAX SCUTCHER.

No. 460,303. Patented Sept. 29, 1891.

Witnesses
A. W. Opsahl.
Frank D. Merchant.

Inventors.
John McGrath
George Y. Smith
By their Attorney.
Jas. F. Williamson (No Model.) 6 Sheets—Sheet 4.
J. McGRATH & G. Y. SMITH.
FLAX SCUTCHER.

No. 460,303. Patented Sept. 29, 1891.

Witnesses.
A. W. Opsahl.
Frank D. Merchant.

Inventors.
John McGrath
George Y. Smith
By their Attorney.
Jas. F. Williamson (No Model.) 6 Sheets—Sheet 5.
J. McGRATH & G. Y. SMITH.
FLAX SCUTCHER.

No. 460,303. Patented Sept. 29, 1891.

Witnesses
A. H. Opsahl.

Inventors
John McGrath
George Y. Smith
By their Attorney
Jas. F. Williamson (No Model.) 6 Sheets—Sheet 6.

J. McGRATH & G. Y. SMITH.
FLAX SCUTCHER.

No. 460,303. Patented Sept. 29, 1891.

UNITED STATES PATENT OFFICE.

JOHN McGRATH AND GEORGE Y. SMITH, OF MINNEAPOLIS, MINNESOTA, ASSIGNORS TO GEORGE N. LYMAN, SR., OF SAME PLACE.

FLAX-SCUTCHER.

SPECIFICATION forming part of Letters Patent No. 460,303, dated September 29, 1891.

Application filed February 24, 1891. Serial No. 382,328. (No model.)

*To all whom it may concern:*

Be it known that we, JOHN MCGRATH and GEORGE Y. SMITH, citizens of Great Britain and the United States, respectively, residing at Minneapolis, in the county of Hennepin and State of Minnesota, have invented certain new and useful Improvements in Flax-Scutchers; and we do hereby declare the following to be a full, clear, and exact description of the invention, such as will enable others skilled in the art to which it appertains to make and use the same.

Our invention relates to machines for dressing fibrous stock—such as flax, hemp, sisal, and other similar plants—to produce line fiber.

In carrying out our invention we conjoin with suitable dressing-drums, which may be adapted either to a scutching or a hackling action, traveling grips, with suitable guiding and driving devices for the same, adapted to hold the stock by one of its ends and submit the other to the action of the dressing-drums. Two sets of dressing-drums and two sets of traveling grips with their driving and guiding devices are placed in tandem arrangement, the grips being so arranged that the grasp of the second grip will be shifted to the opposite end of the stock, so that one end of the stock will be dressed by the first set of dressing devices and the other by the second set of dressing devices, while the stock pursues a continuous course. The traveling grip is preferably composed of flexible metallic bands opposing each other in pairs against suitable resistance-surfaces; and of these bands there are preferably four, or two pairs, which are constrained to pursue a common path through a part of their otherwise divergent circuits. The grip is formed by the opposition or clamping action of the bands in their passage through the common part of their circuits. They are preferably so arranged that they interlock at their meeting points, thus looping in the stock and unlock for the delivery of the stock at their parting point. As the best resistance-surface for the clamping action of the bands I preferably employ a flanged wheel of large diameter, around one segment of which all the bands are made to pass. This wheel will also serve to drive the band and guide the same at the proper dip for the best action of the dressing devices on the stock. The wheel is preferably set in a vertical position over the trough formed by the horizontally-arranged dressing-drums, and may be beveled to permit a lower dip between the two drums. The dressing-drums may be either straight or coniform, and may be equipped on their peripheries either with beaters of any kind for a scutching action or with pins for a hackling action, according as desired.

Although we prefer the flexible metallic bands as the constituent elements of the traveling grip, we may employ ropes or chains. As a convenient term to include all the forms—*i. e.*, bands, cords, ropes, straps, or chains—we shall herein employ the word "cables." When any other form of cable than the metallic band is employed, the clamping and driving-wheel is preferably provided with a series of flanges on its periphery, forming separate grooves between them for receiving the separate cables, the said flanges being of such depth that their sharp edges constitute a material part of the clamping-surface by which the stock is held. Such flanges may also be employed with the metallic bands, but are not so much needed.

A machine embodying our invention is illustrated in the accompanying drawings, therein like letters referring to like parts throughout.

Figure 3:
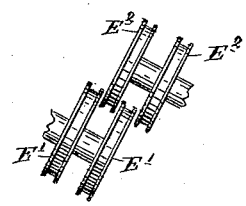
Figure 4:
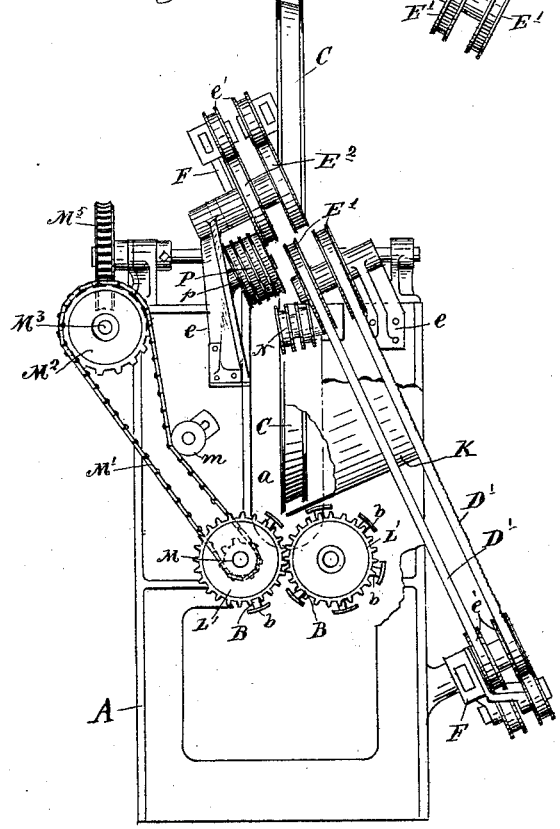
Figure 6:
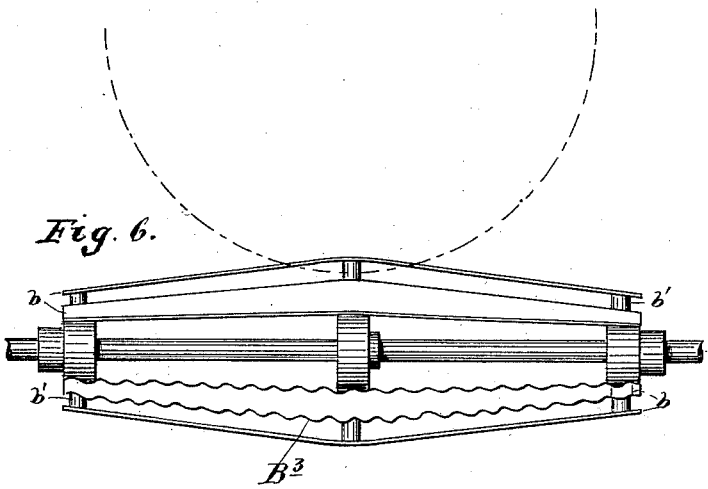
Figure 7:
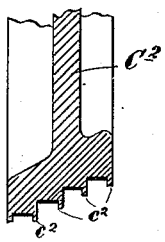
Figure 8:
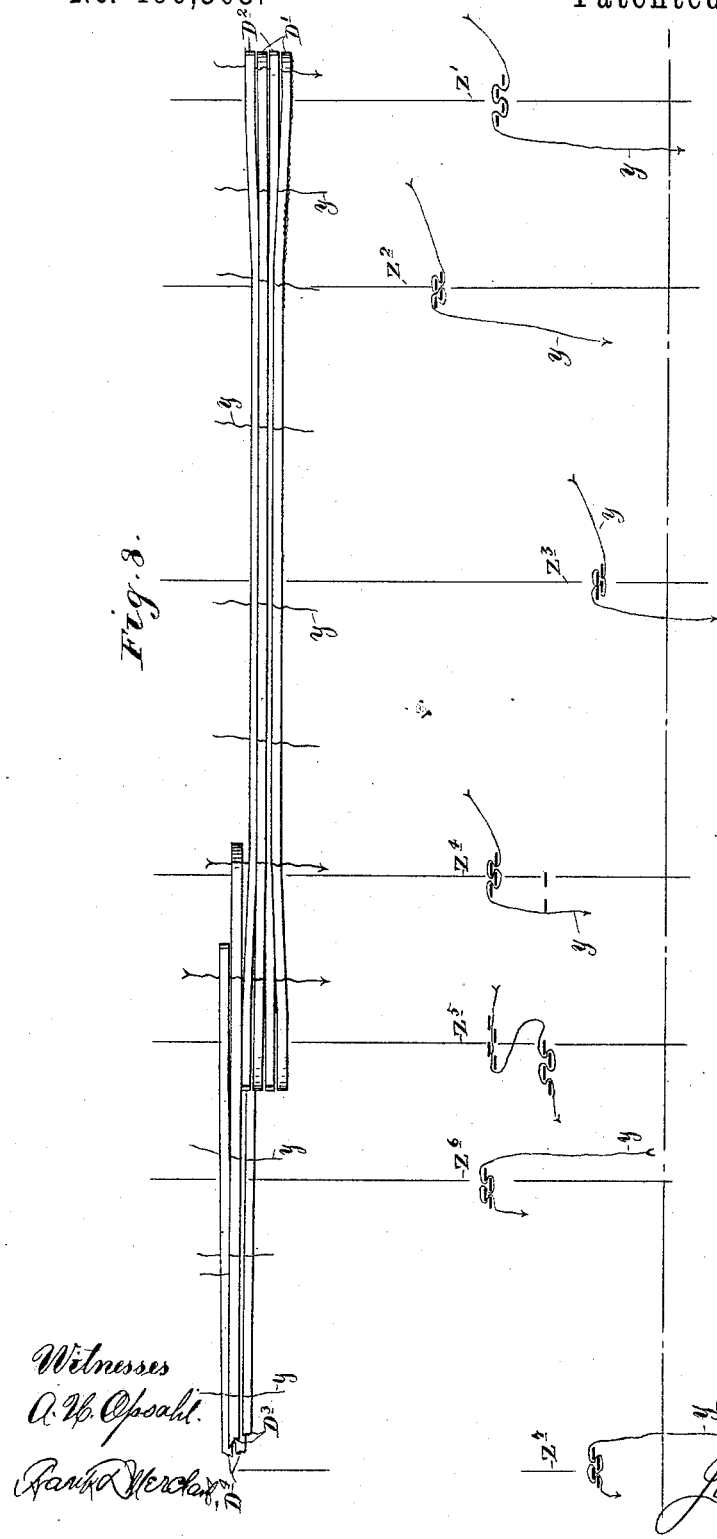
Figure 9:
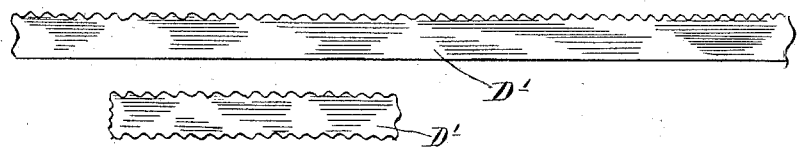

Figure 1 is a left side elevation of the machine, some parts of the second member being broken away. Fig. 2 is a vertical central cross-section on the line X X' of Fig. 1. Fig. 3 is a front elevation of the combined guide and feed-wheels for the cables at the receiving end of the grip, detached. Fig. 4 is a rear end elevation of the first set of devices shown in Fig. 1. Figs. 5 and 6 are views in side elevation of coniform dressing-drums. Fig. 7 is a view in section of a part of the driving-wheel of the modified form, such as would be used with chains or ropes; and Fig. 8 is a diagram illustrating the grip at different points of its action when the metallic bands are employed with the form of driving and clamping wheel shown in Figs. 1 and 2. Fig. 9 is a plan view of a part of one of the bands detached.

A A' are the main frames, the upright portions of which are bifurcated and spaced apart, as shown at $a$, to afford the necessary clearance for the traveling grip and the clamping-wheel.

B B are the dressing-drums, arranged in a horizontal position on the lower part of the frame-work, shown as equipped with beating-blades $b$, having serrated edges for a scutching action. The beating-blades are supported on the ends of radial arms $b'$ and are spaced apart from each other in alternate arrangement on the opposite drums, so that the blades intermesh with each other. The blades are preferably curvilinear, this arrangement giving a sharper stroke with less wind; but radial or tangential blades may be substituted instead, if so desired.

C is the combined driving and clamping wheel for the traveling grip, mounted on the frame in the space $a$ in a vertical position over the trough formed by the dressing-drums. It is provided with a beveled periphery, the extended edge of which dips into the trough between the two drums and is provided with marginal flanges $c$, forming a groove or seat for the bands of the traveling grip.

$D'$ $D'$ and $D^2$ $D^2$ are the flexible bands constituting the first traveling grip, of which $D'$ $D'$ are the lower pair and $D^2$ $D^2$ are the upper pair of the same.

$E'$ $E'$ and $E^2$ $E^2$ are the sets of combined guide and feed wheels, having toothed flanges located at the receiving and delivery ends of the grip, of which $E'$ $E'$ represent the guide-wheels for the lower set of bands $D'$ $D'$, and $E^2$ $E^2$ those for the upper set of bands $D^2$ $D^2$. Of these guide-wheels those arranged at the receiving end of the grip are so located that their peripheries traverse interlocking paths, and those at the delivery end of the grip are so located that their peripheries traverse paths which clear each other, the axes or hubs of the different sets of wheels in each case being at different levels supported from brackets $e$, projecting from the main frame. These brackets and the guide and feed wheels are preferably set at an angle to the main frame for the better clearance of the bands or cables in the return part of their movement. This arrangement permits the upper set to pass to the right of the clamping-wheel C and the lower set along the left side of the main frame over suitable guiding-sheaves $e'$. These cables must always be kept taut under yielding pressure. For this purpose automatic tighteners F, one for each band, are suitably supported, either from the frame or projecting brackets, in the proper position to act on the different bands.

G is a contracting-pulley, located on the frame A between the guide and feed-wheels at the receiving end of the grip, for contracting the bands into an overlapped relation within a narrow path and delivering the same with the interlooped stock to the clamping-wheel C.

G' is a guide-sheave on the frame A between the wheel C and the combined guiding and feeding wheels at the delivery end of the grip.

H are side guards at the receiving end of the grip for holding the stock in proper position.

K is the inclined curvilinear guard-plate, located under the wheel C and projecting outward and upward to one side of the machine for upholding the free end of the stock and guarding the cables against displacement. The lower edge of this guard-plate K is adjacent to the lowermost flange on the wheel C, with clearance between the two for the passage of stock. By the free end of the stock as used herein is meant the part of the same not being subjected to the dressing-drums.

L is a pulley on one of the drums B for the application of power.

$L'$ are gear-wheels on the rear ends of the shafts of the drums B B, engaging with each other.

M is a sprocket-wheel on one of said drums, and M' is a sprocket-chain passing over the wheel M and another sprocket-wheel $M^2$, by which motion is given to a shaft $M^3$, provided with worm-screw $M^4$, engaging with the worm-gear $M^5$ for imparting motion to the clamping-wheel.

$m$ is a tightener for the sprocket-chain M'.

$D^3$ $D^3$ and $D^4$ $D^4$ are respectively the upper and lower sets of bands constituting the second grip, and C' and K' are respectively the clamping-wheel and guard-plate of the second set of devices supported from the frame A'. All the other parts of the second set of devices are similar in all respects to those of the first set, with the exception that the receiving feed-wheels are supported from the frame A and need no additional description. The clamping-wheel C' and the guard-plate K' are similar to the first set, with the single exception that the inclination of the periphery of the wheel and of the guard-plate are in opposite directions from the first set. For bringing the cables of the second grip into the proper position to receive the stock from the delivery end of the first grip the receiving feed-wheels N and P for the second grip are supported on the rear end of the frame A, the former directly on the frame and the latter on a stud $p$, projecting from one of the brackets $e$, the said wheels being spaced apart and located to one side of the delivery-wheels of the first grip. All the bands of the second grip pass on the under side of the wheel P, which brings the same into such position that the second grip underreaches the delivery end of the first grip slightly to one side of the same in the path of the dressed end of the stock coming therefrom. It will therefore receive the stock, grasping the same by its finished end as it is freed up and delivered from the first grip and carry the same forward, with the unfinished end depending therefrom in position to be subjected to the second set of dressing-drums.

Q is a contracting guide-sheave for the second grip located on the front of the frame A'.

The combined feed and guide wheels E' E² are provided with teeth on their marginal flanges, as shown fully in Fig. 1, for affording a positive feed of the stock to and from the grip. These teeth engage the stock by a succession of bites, thus positively holding and feeding the same.

The operation is as follows: The flax or other fibrous stock is supplied to the sets of feed-wheels at the receiving end of the grip parallel with the axes of the same and in position to have one of its ends engaged thereby. In virtue of the position of these wheels the first set feed in the stock positively between the two sets of bands and then interlock the bands with each other by an action similar to the interlocking backward of the fingers of two human hands, thereby buckling the straw upon itself into loops engaged by the opposite sets of bands, which in their progressive movement over the contracting-pulley and the flanged clamping-wheel are contracted together into alternate arrangement, breaking joints with each other, so that the strain on the stock under the action of the dressing-drums tends to tighten or intensify the clamping action of the grip. The tight clamp continues until the delivery end of the grip is reached, where the bands are freed up in virtue of the position of the delivery-wheels located at that end, so as to unlock the stock. The dressed end coming from the first grip is then caught by the second grip exactly as at the receiving end of the first grip, permitting the unfinished end to fall by gravity into position to be acted on by the second set of dressing-drums. While being carried forward by the grip the free end of the stock is upheld out of the way by the guard-plates K and K'.

The nature of the grip is shown in the diagram sheet, Fig. 8, whereon the cross-section on the line Z' represents the relative positions of the bands and the stock at the receiving end of the grip; $Z^2$, the same as the bands pass over the contracting-pulley; $Z^3$, the same when on the clamping-wheel; $Z^4$, the same as they come from the clamping-wheel over the guide-sheave G'. $Z^5$ represents the bands of the first grip as they appear at the delivery end of the same, and those of the second grip as they appear at the receiving end of the same. $Z^6$ represents the second grip as it passes to its clamping-wheel, and $Z^7$ the same when on the wheel.

In the diagram, Fig. 8, Y represents a straw of flax or other fibrous plant.

In Figs. 5 and 6, B² and B³ are modified forms of the dressing-drums, being coniform in shape. Both of the modifications are biconiform, the one B² having the two cones with their small ends together, and the other B³ having the two cones with their large ends together. The first arrangement gives a drum contracted or reduced at its central point, so as to appear of an hour-glass shape, and the other arrangement gives a drum swelled out at its central part, so as to be of barrel-like form. If the stock be of such character that the straight drums would either overwork or underwork it at its extreme dip, one or the other of the biconiform drums may be substituted. With fine and tender stock the straight drums would likely overwork and waste it and the biconiform drum shown in Fig. 5 would be used instead, and with coarse hard stock the straight drums would not work it enough, and the form shown in Fig. 6 would be employed.

In Fig. 7 we have shown the modified form of clamping and driving wheel $C^2$, the same being provided with several peripheral flanges $c^2$ of considerable depth. When a wheel of this kind is employed, the bands do not need to be contracted together so as to overlap; but each may run in a separate groove formed by the division or flange plates $c^2$. The grip in that case will be afforded by the clamping action over the edges of the bands and the projecting edges of the flanges. With this form of clamping-wheel other forms of cables may be employed instead of the bands—as, for example, wire ropes or chains—although in neither case will the chains or wire cables be as satisfactory as the bands.

In order to insure the stock from slipping either lengthwise or crosswise of the grip afforded by the interlocking bands, one or more of the same may have serrated edges.

The dressing-drums have been shown for a scutching action. Of course it will be understood that they might be equipped with pins instead of beaters in order to give a hackling action.

What we claim, and desire to secure by Letters Patent, is as follows:

1. The combination, with a supporting-frame, of a resistant clamping-wheel having a groove and a traveling grip consisting of flexible bands overlapping each other within said groove, substantially as described.

2. The combination, with a supporting-frame, of a resistant clamping-wheel having a groove, a traveling grip consisting of flexible bands, and suitable contracting and guiding wheels located in proximity to the groove of the clamping-wheel, the width of the groove being less than the combined width of the bands and the peripheries of the contracting and guiding wheels traversing interlocking paths, substantially as described.

3. The combination, with the traveling grip consisting of endless cables and the grip clamping and driving wheel, of the guard-plate for upholding the free ends of the stock and preventing displacement of the cables, substantially as described.

4. The combination, with the traveling grip consisting of endless cables, of the beveled and flanged grip clamping and guide wheel and the inclined curvilinear guard-plate for upholding the free ends of the stock and preventing the displacement of the cables, the said parts being arranged and operating substantially as described.

5. The combination, with the pair of traveling grips in tandem arrangement, of the pair of beveled driving-wheels for the same and their respective inclined guard-plates for protecting the free end of the stock, the said beveled wheels and guard-plates being arranged so that the inclinations of the second set are in opposite directions from the first set, substantially as described.

6. The combination, with the traveling grip consisting of endless cables opposing each other, of guide-wheels for said cables, provided with serrated or toothed flanges for affording a positive feed, substantially as described.

7. The combination, with the traveling grip consisting of the endless cables opposing each other, of the combined clamping and driving wheel and the combined guide and feed wheels for said cables, located at the receiving and delivery ends of the grip, those at the receiving end being so located that the opposing sets traverse interlocking paths and those at the delivery end so as to be clear of each other, substantially as described.

8. The combination, with the traveling grip composed of one or more pairs of endless cables opposing each other, of the combined clamping and driving wheel, the combined guide and feed wheels at the receiving and delivery ends of the grip, and the contracting pulley between the set of receiving feed-wheels and the clamping-wheel, substantially as described.

9. In a machine for dressing fibrous stock, a pair of symmetrical dressing-drums working together in pairs, each drum being of biconiform shape, substantially as and for the purpose set forth.

10. In a machine for dressing fibrous stock, the combination, with a traveling grip for holding the stock, of symmetrical dressing-drums working together in pairs, each drum being of biconiform shape, substantially as described.

11. In a machine for dressing fibrous stock, the combination, with a resistant clamping-wheel, of a traveling grip for presenting the stock to the dressing devices, consisting of two or more flexible bands having serrated edges made to overlap each other on said resistant clamping-wheel, substantially as described.

In testimony whereof we affix our signatures in presence of two witnesses.

JOHN McGRATH.
GEORGE Y. SMITH.

Witnesses:
JAS. F. WILLIAMSON,
EMMA F. ELMORE.